US008565086B2

(12) United States Patent
Chen et al.

(10) Patent No.: US 8,565,086 B2
(45) Date of Patent: *Oct. 22, 2013

(54) METHOD AND APPARATUS FOR TRAFFIC SHAPING

(75) Inventors: Minghua Chen, Coquitlam (CA); Thomas Wing Tong Ng, Richmond (CA)

(73) Assignee: Ericsson AB, Stockholm (SE)

( * ) Notice: Subject to any disclaimer, the term of this patent is extended or adjusted under 35 U.S.C. 154(b) by 339 days.

This patent is subject to a terminal disclaimer.

(21) Appl. No.: 12/899,367

(22) Filed: Oct. 6, 2010

(65) Prior Publication Data

US 2011/0019571 A1    Jan. 27, 2011

Related U.S. Application Data

(63) Continuation of application No. 11/583,525, filed on Oct. 18, 2006, now Pat. No. 7,830,796.

(51) Int. Cl.
*H04L 12/26* (2006.01)

(52) U.S. Cl.
USPC .......................................................... 370/233

(58) Field of Classification Search
None
See application file for complete search history.

(56) References Cited

U.S. PATENT DOCUMENTS

| | | |
|---|---|---|
| 2002/0089929 A1 | 7/2002 | Tallegas et al. |
| 2002/0116521 A1 | 8/2002 | Paul et al. |
| 2004/0136379 A1* | 7/2004 | Liao et al. ................. 370/395.21 |
| 2007/0076613 A1* | 4/2007 | Malhotra et al. ............. 370/235.1 |
| 2008/0084824 A1* | 4/2008 | Chin et al. ................. 370/235.1 |

OTHER PUBLICATIONS

"Token Bucket", 3 pgs., dated Oct. 18, 2006, http://en.wikipedia.org/wiki/Token_bucket.
"The ATM Forum, Technical Committee" Traffic Management Specification, Version 4.1, AF-TM-0121.000, dated Mar. 1999, 127 pgs.
Cisco, "Comparing Traffic Policing and Traffic Shaping for Bandwidth Limiting", Document ID: 19645, dated Oct. 4, 2006, 10 pgs., http://www.cisco.com/warp/public/105/policevsshape.html.
Cisco, "Policing and Shaping Overview", dated Oct. 4, 2006, 18 pgs., http://www.cisco.com/univered/cc/td/doc/product/software/ios122/122cgcr/fqos_c/fqcprt4/qcfpolsh.html.
J. Heinanen, et al., "A Single Rate Three Color Marker", University of Pennsylvania, Sep. 1999, 8 pgs., http://www.ietf.org/rfc/rfc2697.txt?number=2697.
J. Heinanen, et al., "A Rate Three Color Marker", University of Pennsylvania, Sep. 1999, 7 pgs., http://www.ietf.org/rfc/rfc2698.txt?number=2698.
Menth, et al., "Elastic Token Bucket—A Traffic Characterization for Time-Limited Bursty Traffic", University of Wrzburg Institute of Computer Science Research Report Series, Report No. 324 dated Feb. 2004, 10 pgs.
"Metro Ethernet Forum—Technical Specification" MEF 10, Ethernet Services Attributes Phase 1, dated Nov. 2004, 37 pgs.

* cited by examiner

*Primary Examiner* — Raj Jain
(74) *Attorney, Agent, or Firm* — Blakely Sokoloff Taylor & Zafman LLP (57) ABSTRACT

A method and apparatus for a traffic shaper that uses a traffic shaping algorithm based on a sustained rate token bucket and a constant rate emitter. The sustained rate token bucket uses a plurality of tokens based on the sustained rate and the sustained burst size. The constant rate emitter allows transmission of traffic at an adjusted transmission rate, where the adjusted transmission rate is derived from the peak rate, peak burst size, sustained rate and sustained burst size.

22 Claims, 9 Drawing Sheets

METHOD AND APPARATUS FOR TRAFFIC SHAPING

CROSS-REFERENCE TO RELATED APPLICATIONS

This application is a continuation of U.S. Pat. No. 7,830, 796, Application respectively filed Oct. 18, 2006, which is hereby incorporated by reference.

BACKGROUND

1. Field

Embodiments of the invention relate to the field of computer networking; and more specifically, to traffic shaping using sustained rate and constant rate emitter buckets.

2. Background

Traffic shaping attempts to control the volume and rate of data traffic, or traffic, being transmitted into a data network. The flow, of data in a network is typically occurs in bursts, meaning that the flow will be high at times, or low, and not always a constant rate of data. Traffic shaping counters these changes in rates by debursting traffic flows, i.e., smoothing high rate peaks and low rates troughs. The benefits of traffic shaping are lower latency, less jitter, and reduced packet loss.

Typically a network element situated at the edge of a network shapes the traffic, assuming the network element has the capability to do so. Traffic shaping is typically governed by a series of parameters that are taken from a customer's service level agreement. A service level agreement is an agreement between a network service provider and the customer that specifies, in measurable terms, what services and guarantees of service the network service provider provides for the customer. Service level guarantees typically involve different forms of rate guarantees. For example, one form of guarantees sets a long-term sustained transmission rate. This type of guarantee means that a customer can transmit over a long time frame up to the sustained transmission rate. Nevertheless, because of the bursty nature for data transmission, some service level agreements allow a customer to temporarily transmit traffic above the sustained transmission rate. The amount a customer can transmit above the sustained rate, also known as a burst, is characterized by an allowed burst rate and burst size. While in one embodiment, the burst rate is given in bytes per second and the burst size is given in bytes, in alternative embodiments, the rate and period can be given in different parameters (e.g., bits, kilobytes, megabytes, number of packets/cells/frames, milliseconds, microseconds, etc.).

A traffic shaper accumulates traffic by queuing received data packets in one or more packet queues. While in one embodiment there is one packet queue that holds all of the packets waiting to be transmitted by the traffic shaper, in alternate embodiments, there is a plurality of queues for different type of packets. In the alternate embodiments, packets can be classified into various unique streams of data using a variety of techniques known in the art, such as by destination address, source address, customer, application type, packet data contents, virtual local area network (VLAN) tag, multi-protocol label switching (MPLS) tag, type of service (TOS) bit, differentiated services (diffserv) bit, etc. Typically, a traffic shaper stores each of the unique streams of data in a separate queue while preparing to transmit the streams of data. By delaying or speeding up the transmission of queued packets, a traffic shaper shapes the incoming bursty traffic into a smooth flow of outgoing traffic. Furthermore, a traffic shaper can shape the separate streams of data differently and for independently (e.g., applying different sets of traffic shaping parameters to different stream of traffic, using separate queues for different streams of data, etc.). While in one embodiment, the traffic shaper shapes streams of Ethernet traffic, in alternate embodiments, the traffic shaper shapes the same and/or different types of traffic (e.g., Internet Protocol (IP), Asynchronous Transfer Mode (ATM), Frame Relay, Synchronous Optical Network (SONET), etc.)

Traffic shapers use the burst parameters to shape incoming bursty traffic. One of the general algorithms used for traffic shaping is the so-called token bucket algorithm. This algorithm dictates when traffic can be transmitted by using one or more token bucket that contains tokens. The tokens are, in effect, permissions for the traffic shaper to transmit certain number of bytes into the network. While in one embodiment, each token represents one or more bytes, in alternate implementations, a token can be used to represent one or more packets, cells, frames, or any other unit of measurement used in transmitting traffic. If there is a token in the bucket, the transmitting network element can transmit the data. In addition, the transmitting network element decrements the number of tokens corresponding to the traffic transmitted. On the other hand, if there are no tokens in the bucket (or not enough), the network element delays the transmission.

FIGS. 1-3, 5, 7, and 8 below use a number of common parameters, which are:

Bp: Burst size in bytes for the peak rate token bucket;
Rp: Rate in bytes per second for the peak rate token bucket;
Bs: Burst size in bytes for the sustained rate token bucket;
Rs: Rate in bytes per second for the sustained rate token bucket;

where $Bs>=Bp$ and $Rs<=Rp$. Based on the above definitions, the following intermediate parameters are defined:

$$Tp = \frac{(Bp-1)}{Rp} \quad (1)$$

$$BT = \frac{(MBS-1)}{Rp} \quad (2)$$

$$Ts = (MBS-1) * \left(\frac{1}{Rs} - \frac{1}{Rp}\right) \quad (3)$$

where Tp is the delay deviation tolerance for peak rate traffic. MBS is the maximum burst size in bytes traffic can be sent at peak rate, BT is the maximum burst time in which peak rate sending can last, and Ts is the delay deviation tolerance for sustained rate traffic. From traffic engineering, $$Tp + Ts = \frac{(Bs-1)}{Rs} \quad (4)$$

Figure 1:
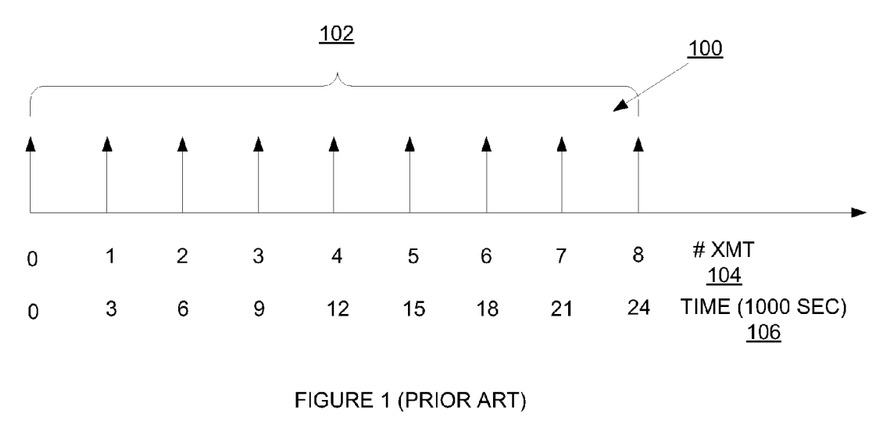
FIG. 1 (Prior Art) is an illustration of a byte transmission graph 100 by a traffic shaper employing a sustained rate token bucket algorithm in two typical scenarios.

FIG. 1 is an illustration of a byte transmission graph 100 by a traffic shaper employing a sustained rate token bucket algorithm. In FIG. 1, graph 100 illustrates the time 106 when bytes 102 are transmitted by the traffic shaper. Superimposed on timeline 106 is when the traffic shaper transmits bytes 102 as illustrated by byte timeline 104. The token bucket in this example is characterized by a sustained rate Rs and a burst size Bs. This algorithm works by starting with a filled token bucket of depth size equal to the sustained burst size, Bs. For each byte(s) (or packet, cell, frame, etc.) transmitted, the traffic shaper decrements that token by the number of bytes transmitted. In addition, the traffic shaper slowly refills the token bucket at a rate equal to the Rs, the sustained rate. Thus, this algorithm allows for a traffic shaper to transmit at the linerate of the associated physical interface for the sustained burst size because there are initially enough tokens in the token bucket to support such a transmission burst.

FIG. 1 further illustrates nine bytes being evenly transmitted over time period 106 of 24,000 seconds with Rs=1/3000. Furthermore, FIG. 1 illustrates two typical scenarios. In one embodiment, if Bs=1, the traffic shaper starts working at time zero. In an alternate embodiment, if Bs>1, when having passed the initial burst based on Rs, the traffic shaper transmits in the sustained output period. The sustained output period can last as long as there is a byte to send (e.g., a packet is queued) when the traffic shaper is ready to transmit. In either embodiment, the same pattern repeats at time 27,000 seconds. The traffic shaper achieves the same sustained rate throughput over different lengths of time periods. While the embodiments illustrated by FIG. 1 show time period 106, alternate embodiments may have shorter or longer time periods, representing faster or slower sustained transmission rates.

Figure 2:
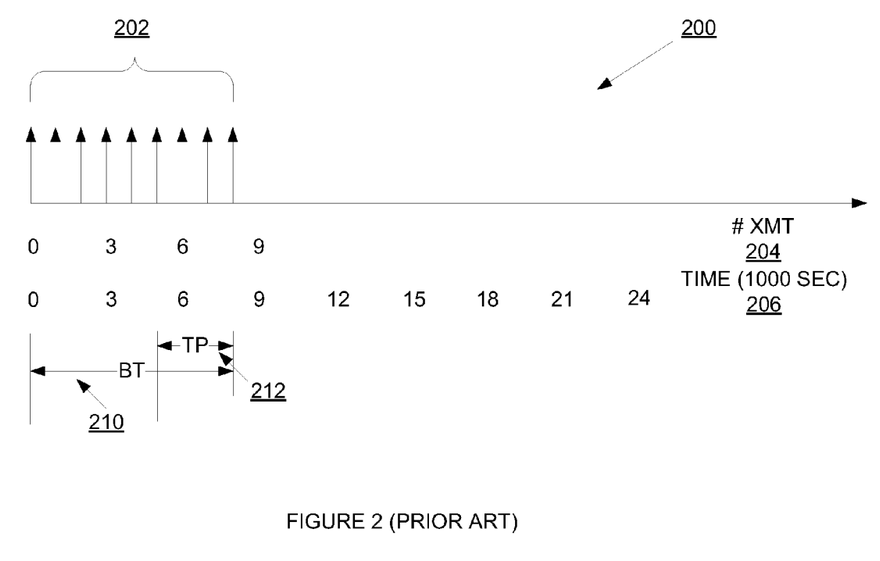
FIG. 2 (Prior Art) is an illustration of a byte transmission graph 200 by a traffic shaper employing a peak rate token bucket algorithm in a typical scenario.

On the other hand, FIG. 2 is an illustration of a byte transmission graph 200 by a traffic shaper employing a peak rate token bucket algorithm with Bp=4 and Rp=1/1000. FIG. 2 illustrates a typical scenario that generates the same throughput as the single sustained rate token bucket. To achieve this traffic pattern, additional limiting factor is needed. There are enough tokens in the sustained rate token bucket and there is no packet backlogged in the transmitted queue after time BT 210. In FIG. 2, graph 200 illustrates the time 206 when the traffic shaper transmits the bytes 202. Superimposed on timeline 206 is when the traffic shaper transmits bytes 202 as illustrated by byte timeline 204.

The peak rate token bucket is characterized by a peak rate Rp and burst size Bp. Similar to graph 100 in FIG. 1, graph 200 represents a traffic shaper transmitting a stream of data using token bucket algorithm configured with a depth of peak burst rate Bp and refills at a rate of Rp. The algorithm starts with a filled token bucket of depth Bp. For each packet transmitted by the traffic shaper, the token bucket is decremented by the size of the packet transmitted. In addition, the traffic shaper refills the token bucket at a rate of Rp. Similar to FIG. 1, this token bucket algorithm also allows the traffic shaper to initially transmit at the linerate of the associated physical interface for the peak burst size because there are initially enough tokens to support such a burst. Similar to FIG. 1, the same pattern repeats at time 27,000 second so that the same average throughput can be achieved over different length of observing time periods by both the pattern in FIG. 1 or FIG. 2. It should be aware that the single peak rate token bucket could continue its transmission at time 9,000 second. To achieve the traffic pattern as show in FIG. 2, the traffic may have had an interruption between the time 9,000 until 27,000, or a second limiting factor may be working together with the peak rate token bucket, such as the sustained rate token bucket described later. In comparison with graph 100, graph 200 illustrates a higher transmission rate because the bytes are transmitted is shorter time A modification to further refine the burst is to use two independent token buckets. In this algorithm, four shaping parameters (Rp, Bp, Rs, and Bs) are used to define two independent token buckets applied in series. The first token bucket works as described above for the sustained rate single token bucket. The second token bucket typically enforces the burst traffic not to exceed a certain peak rate at a certain burst size.

Figure 3:
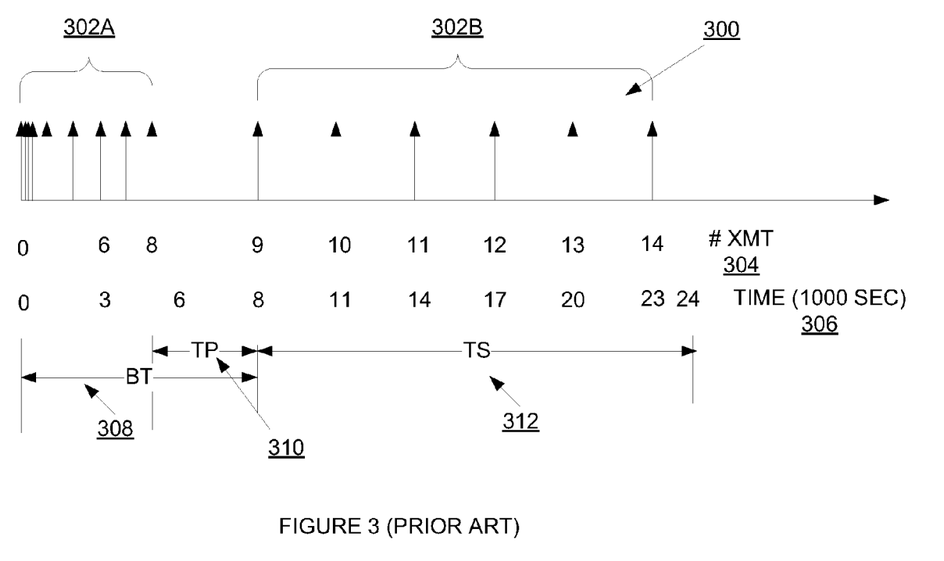
FIG. 3 (Prior Art) is an illustration of a byte transmission graph 300 by a traffic shaper utilizing a dual token bucket algorithm.

FIG. 3 is an illustration of a byte transmission graph 300 by a traffic shaper utilizing a dual token bucket algorithm. Superimposed on timeline 306 is when the traffic shaper transmits bytes 302A-B as illustrated by byte timeline 304. This shaper uses two token buckets: a peak rate token bucket and a sustained rate token bucket. As above, each token bucket is independent, meaning that the adding and draining of tokens from the buckets is calculated independently. However, the draining of a token has to be done at the time both the buckets agree on. Because a token bucket always agrees to drain a token later than the earliest possible time, the bucket that decides the later draining time will govern the outgoing traffic pattern. Because this shaper uses both types of buckets, graph 300 shows a peak burst of bytes 302A and the sustained rate transmission of bytes 302B. The transmission of bytes 302A is governed by the peak rate token bucket whereas the transmission of bytes 302B is governed by the sustained rate token bucket. This is because during the time period BT-Tp, there are enough tokens in the sustained rate token bucket to support transmission of packets at a rate above Rs, but the number of tokens in the peak token bucket is being drained to zero. After time BT-Tp, the peak rate token bucket has more tokens and the sustained rate token bucket governs the transmission of bytes 302B. Superimposed on timeline 306 is when the traffic shaper transmits bytes 302A-B as illustrated by byte timeline 304. Furthermore, graph 300 illustrates Ts 312 and Tp 310.

FIG. 3 shows the scenario where the dual token bucket algorithm just starts working at time zero with both buckets full. It also assumes that there is always a byte available when the shaper decides to send a byte at its earliest possible time. Similar to FIGS. 1 and 2, transmission pattern 302B repeats beyond the right border of the figure to last for an infinite length time. When also considering the quiet period before time zero in which both buckets can fill up, the sustained rate throughput is achieved by byte transmission pattern 304 as in FIGS. 1 and 2. As per above, the peak rate token bucket when working together with a sustained rate token bucket allows burst traffic exceeding the sustained rate Rs but this algorithm fails to limit the traffic rate at the start of the burst period. This means that burst traffic can be transmitted at line rate at the beginning of the burst period.

Also known in the art are dual token bucket algorithms that couple the filling and draining of the token buckets together, instead of allowing the token bucket to be independent. Nonetheless, these algorithms still suffer the burstiness problems illustrated above.

Figure 4:
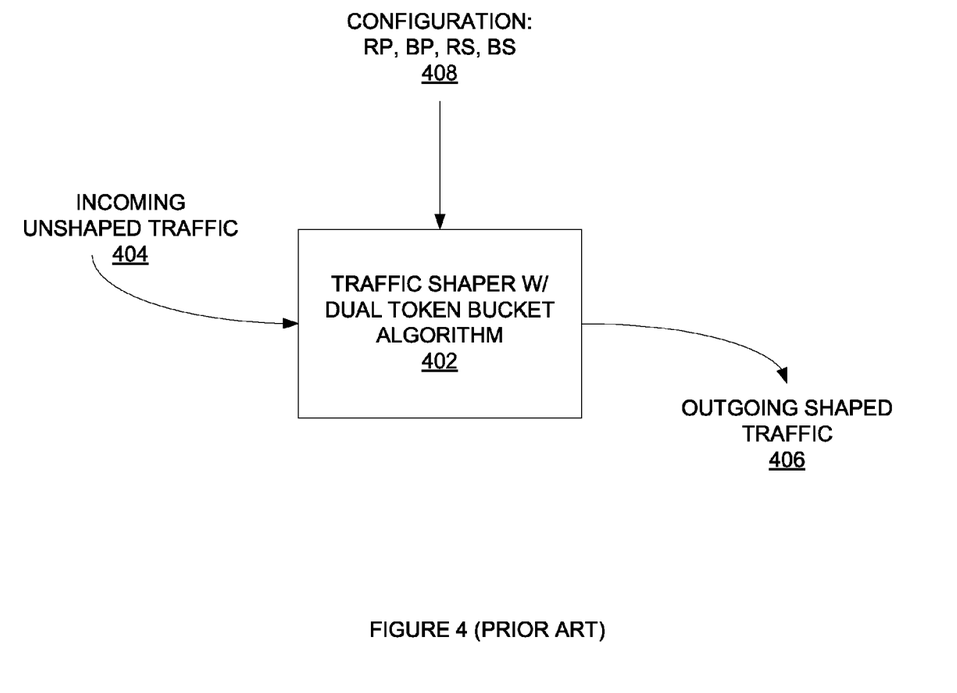
FIG. 4 (Prior Art) is a block diagram illustrating a dual token bucket traffic shaper.

FIG. 4 is a block diagram illustrating a dual token bucket traffic shaper. In FIG. 4, the traffic shaper with the dual token bucket algorithm 402 uses configuration 408 to shape the incoming unshaped traffic 404 and transmit the outgoing shaped traffic 406. Traffic shaper 402 uses the four configuration parameters, Rp, Bp, Rs, and Bs, to shape the traffic with a sustained rate and peak rate token bucket as described above.

While the token bucket algorithms smoothes out the traffic over long periods of time, all of these algorithms allow for short period bursts at linerate if there are enough tokens in the bucket. Even these short bursts can overwhelm other network elements down stream, especially when a high bandwidth device transmits short burst to lower bandwidth devices.

BRIEF SUMMARY

A method and apparatus for a traffic shaper that uses a traffic shaping algorithm based on a sustained rate token bucket and a constant rate emitter. The sustained rate token bucket uses a plurality of tokens based on the sustained rate and the sustained burst size. The constant rate emitter allows transmission of traffic at an adjusted transmission rate, where the adjusted transmission rate is derived from the peak rate, peak burst size, sustained rate and sustained burst size.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. However, element numbers are the same for those elements that are the same across different Figures. In the drawings.

DETAILED DESCRIPTION

In the following description, numerous specific details such as network element, traffic shaper, token bucket, constant rate emitter, packet, processor card, line card, and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

Exemplary embodiments of the invention will now be described with reference to FIGS. 5-10. In particular, the operations of the flow diagrams in FIG. 7 will be described with reference to the exemplary embodiments of FIGS. 5-6. However, it should be understood that the operations of these flow diagrams can be performed by embodiments of the invention other than those discussed with reference to FIGS. 5-6, and that the embodiments discussed with reference to FIGS. 5-6 can perform operations different than those discussed with reference to these flow diagrams.

A method and apparatus for traffic shaping using an improved token bucket is described below. The basic idea is replace the burst period shown in FIG. 3 with a steady period that lasts the BT-Tp period as the original burst. According to one embodiment of the invention, the traffic shaper transmits bytes based on using a sustained rate token bucket and a constant rate emitter on a byte oriented basis. According to another embodiment of the invention, the sustained token bucket and constant rate emitter are given on a packet oriented basis. According to a further embodiment of the invention, the sustained token bucket and constant rate emitter are given on a variable packet size basis where the packets have a maximum size. While embodiments are shown using this algorithm applied to a dual token bucket traffic shaper, alternate embodiments can apply this algorithm to other forms of dual token bucket traffic shapers (e.g., coupled dual token buckets, modified token algorithms, etc.).

Figure 5:
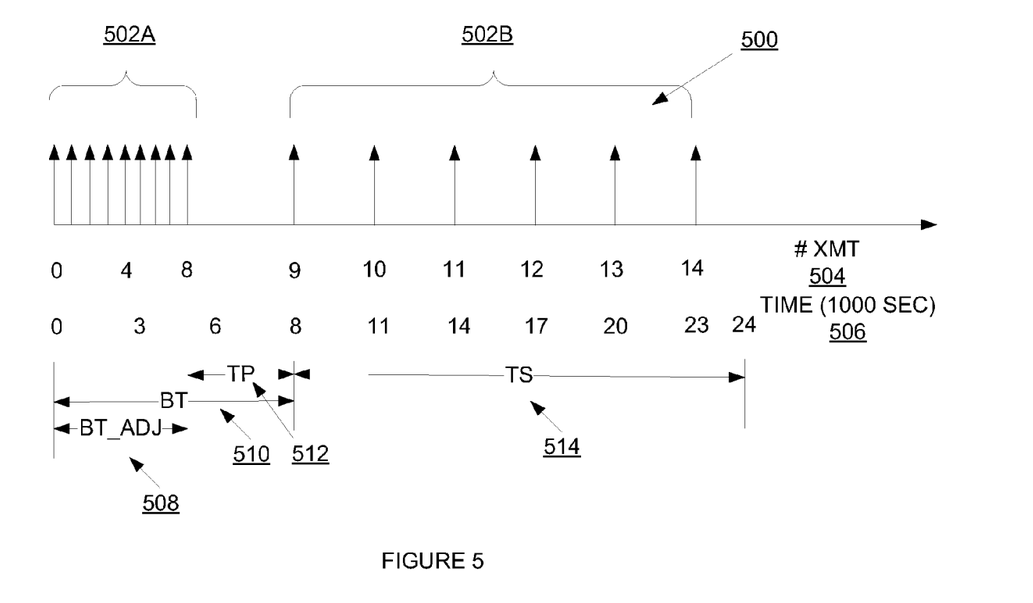
FIG. 5 is an illustration of a byte transmission graph by a traffic shaper utilizing an improved token bucket traffic shaper according to one embodiment of the invention.

FIG. 5 is an illustration of a byte transmission graph 500 by a traffic shaper utilizing an improved token bucket traffic shaper according to one embodiment of the invention. In FIG. 5, the resulting transmission graph 500 does not exhibit the short bursts that were a problem with the traditional dual token bucket traffic shaper in FIG. 4. The two independent token buckets characterized by four parameters Rp, Bp, Rs, and Bs as illustrated in FIG. 3 are replaced by a single token bucket with rate Rs and burst size Bs and a constant rate emitter that operates at rate Rp_adj. The constant rate emitter enforces the upper bound of the emitting rate during the burst period. Thus, instead of enforcing four parameters in an independent dual token bucket algorithm, the traffic shaper in FIG. 5 enforces three parameters (Rs, Bs, and Rp_adj). Even though the four traffic shaping parameters are degenerated into three parameters, this traffic shaping algorithm does not violate the service contract imposed by the original four parameters (Rs, Bs, Rp, and Bp). The validity can be explained intuitively by comparing the burst period BT-Tp in FIG. 3, and burst period BT_adj 508 in FIG. 5. During burst period BT_adj 508, the traffic shaper transmits the same number of packets as BT-Tp, even though nearly all the bytes are delayed a little from BT-Tp. Thus, burst period BT_adj 508 is in compliance with the bytes transmitted during BT-Tp in FIG. 3. Compliance can be shown by sending traffic from a traffic shaper using the proposed algorithm to a traditional dual token bucket traffic shaper. In this embodiment, the input traffic pattern and the output traffic pattern of the traditional dual token bucket shaper will be identical. This shows the input traffic is in compliance with the traditional dual token bucket, thus the service contract. Another way to understand the compliance is in the following description of the proposed algorithm. Assume the improved traffic shaper has the original peak rate token bucket still active, i.e. refilling and draining at the original rate and rule, the original peak rate token bucket will not affect when a packet will be transmitted. The compliance is verified by looking at the original peak rate token bucket depth. The depth will be shown to be always not less than zero, thus the compliance is proved. This is an improved case of the dual token bucket, in that it uses less parameters and emits smoother traffic. Hence the proposed algorithm is referred to as an improved token bucket traffic shaper. While in one embodiment, the constant rate emitter is implemented as a token bucket with a depth of one, in alternate embodiments, the constant rate emitter can be implemented using different algorithms known in the art.

The constant rate emitter enforces a transmission rate of Rp_adj, which is $$Rp\_adj = Rp * \frac{1}{1 - \frac{Tp}{BT}}, \text{ when } Tp < BT \quad (5)$$

or $$Rp\_adj = \text{linerate}, \text{ when } Tp >= BT \quad (6)$$

This formulation of Rp_adj drains up the original peak rate token bucket gradually and linearly in the longest burst period form time 0 to time BT-Tp. In addition, Rp_adj is greater than Rp (see (5)).

In FIG. 5, graph 500 illustrates the time 506 when the traffic shaper transmits the bytes 502A-B. While in one embodiment, traffic shaper transmits bytes as part of Ethernet frames, in alternate embodiments, traffic shaper transmits bytes that are part of different network units (e.g., IP packets, ATM cells, Frame Relay frames, etc.). As with graphs 300, graph 500 assumes that there is a continual supply of bytes waiting to be transmitted. The algorithm is assumed to starts at time zero with the sustained token bucket full. FIG. 5 illustrates two groups of transmitted bytes. The constant rate emitter with rate Rp_adj moderates the group illustrated by bytes 502A during the time period 0-5 thousand seconds. In addition, during this time, the traffic shaper removes tokens from the sustained rate token bucket. During this time period, BT_adj 508, there are enough tokens for the traffic shaper to transmit at a rate higher than Rs.

Furthermore, in FIG. 5, the dynamics in time line 506 illustrate the algorithm shaping the traffic. BT_adj 508 represents the burst time at the adjusted peak rate, Rp, $$BT\_adj = \frac{MBS - 1}{Rp\_adj} \quad (7)$$

In this embodiment, it is useful to understand the operation of the proposed algorithm as if the original peak rate token bucket was still operating but did not shape the traffic. At time BT_adj 508, both the sustained rate and the original peak rate token buckets are emptied by sending the last byte in the peak rate period. Before BT_adj 508, the original peak rate token bucket is refilled at rate Rp and drained at Rp_adj. Because Rp_adj>Rp, the original peak rate token bucket depth continues to drop during this time period. This bucket is full at the starting point of the period before emitting the first byte, and empty at the ending point of the period after emitting the last byte in the burst. The original peak rate token bucket does not drain below zero, proving that the emitting traffic complies with the original in the burst period BT_adj 508. At time greater than BT_adj 508, the sustained rate token bucket is refilled at rate Rs. Because that rate is lower than the original peak rate token bucket refill rate Rp or the peak rate constant rate emitter rate Rp_adj, the traffic shaper transmits at the sustained rate Rs. In this sustained rate period, the original peak rate token bucket fills gradually to the limit Bp, but it does not drain below zero. This proves that the emitting traffic complies with the original peak rate token bucket in the sustained period. The sustained rate token bucket is in full operation in the proposed algorithm thus the traffic always complies with the customer's service level agreement. Thus, the original traffic contract is complied with during the operation of the traffic shaper.

In FIG. 5, the parameters values illustrated are:

$$Rp = \frac{1}{1000}$$

$$Rs = \frac{1}{3000}$$

$$MBS = 9$$

$$Bp = 4$$

$$Tp = 3000$$

$$BT = 8000$$

$$Ts = 16000$$

$$Bs = (Tp + Ts) * Rs + 1 = \frac{22}{3}$$

$$Rp\_adj = 1/625$$

$$BT\_adj = 5000$$

In one embodiment, multiple channels from multiple traffic shapers are multiplexed into a single physical port. When there is no contention among transmitting channels, the simplified traffic shaping algorithm is equivalent to the original dual token bucket algorithm. This is because for long enough sequence of bytes, the conforming transmitted traffic from both types of shapers last the same length of time and average to the same average rate. On the other hand, when there are contentions for emitting time slots among channels, the proposed traffic shaping algorithm acts as an optimal constant peak rate shaper. Any other constant rate emitter acting as a peak rate period shaper will not be able to transmit traffic at a rate higher than Rp_adj. The original dual token bucket algorithm specified by (Rp, Bp, Rs, Bs) can degenerate into a constant rate emitter and a sustained rate token bucket when Bp=1. However, original dual token bucket rate Rp is lower than Rp_adj which gives the original dual token bucket less ability to recover lost time slots due to channel contention. The new rate Rp_adj gives the upper boundary at which a constant rate emitter can act as a peak rate constant rate emitter in the improved token bucket algorithm. In one embodiment, when a down-stream device can only receive traffic at a rate Rp_real, then the peak rate constant rate emitter should be set to use the smaller of Rp_real and Rp_adj. Working this way, it will avoid packets being dropped by the down-stream device. Contentions for transmitting time slots can occur due to multiple channels trying to schedule a packet emitting in the same time slot. Only one of the contending channels will be able to send. Thus other channels will lose the bandwidth. A traffic shaper should be able to recover bandwidth by some kind of burst.

Figure 6:
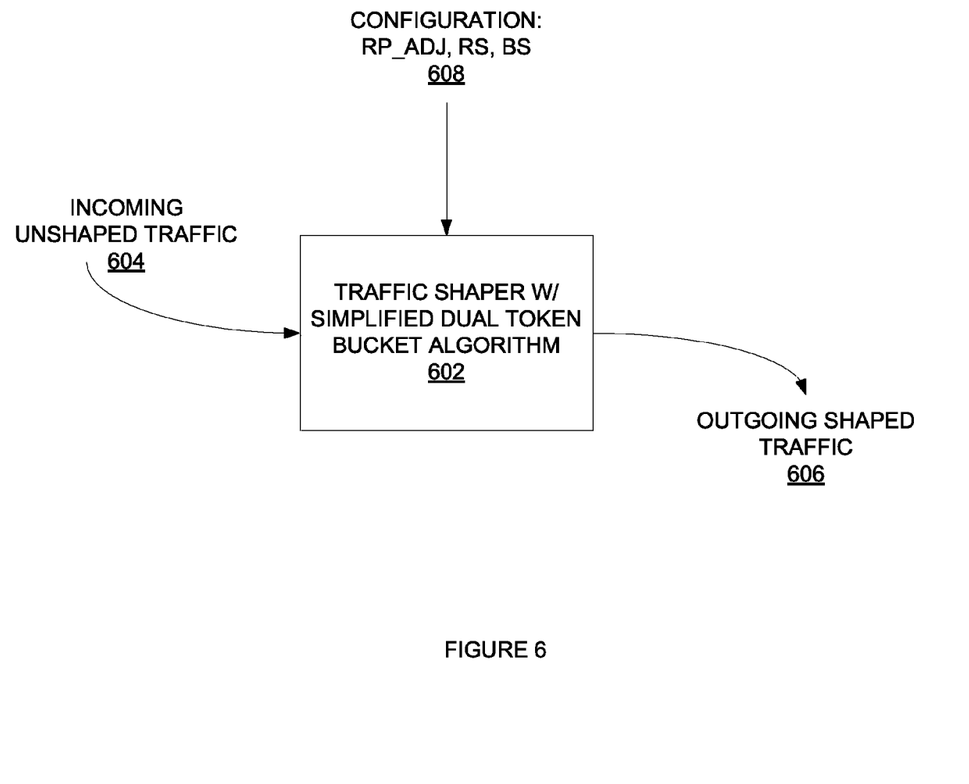
FIG. 6 is a block diagram illustrating an improved token bucket traffic shaper according to one embodiment of the invention.

FIG. 6 is a block diagram illustrating an improved token bucket traffic shaper according to one embodiment of the invention. In FIG. 6, the traffic shaper with the improved token bucket algorithm 602 uses configuration 608 to shape the incoming unshaped traffic 604 and transmit the outgoing shaped traffic 606. Unlike the traffic shaper 406, traffic shaper uses three configuration parameters Rp_adj, Rs, and Bs to shape the traffic with a sustained rate token bucket and a constant rate emitter token bucket.

Figure 7:
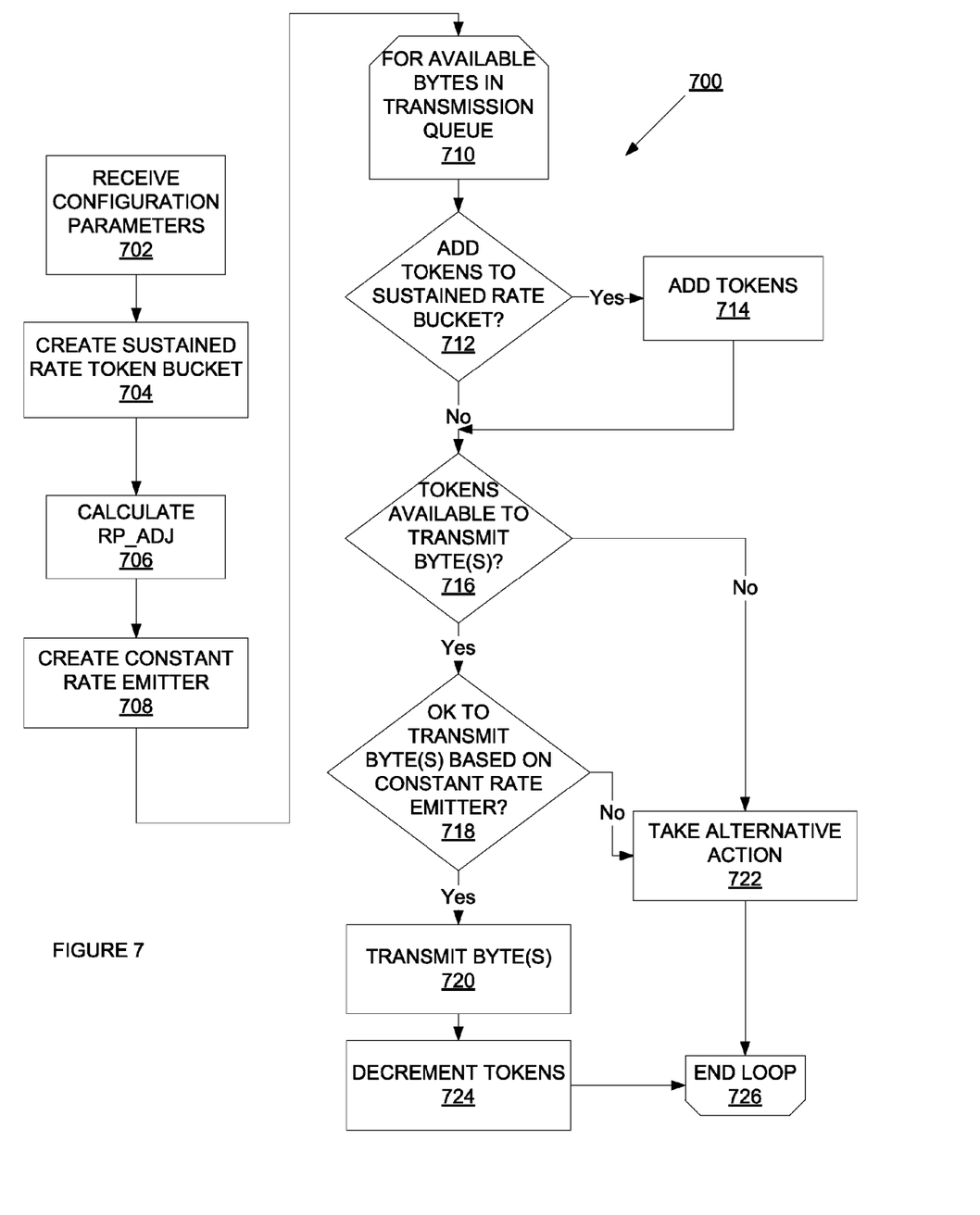
FIG. 7 is an exemplary flow diagram for transmitting bytes using the improved token bucket algorithm according to one embodiment of the invention.

FIG. 7 is an exemplary flow diagram of a method to transmit bytes using the improved token bucket algorithm according to one embodiment of the invention. While this embodiment is described in terms of transmitting packets, alternate embodiments can transmits cells, frames, or any other type of packetized stream of data. In FIG. 7, at block 702, method 700 receives the configuration parameters for the two token buckets. While in one embodiment, method 700 receives Rp, Bp, Rs, and Bs, in alternate embodiments, method 700 receives the same and/or different configuration parameters.

At block 704, method 700 creates the sustained rate token bucket. While in one embodiment, method 700 creates the sustained rate token bucket using Rs and Bs, in alternate embodiment, method 700 creates the sustained rate bucket using the same and/or different parameters. In addition, method 700 fills the sustained rate token bucket with enough tokens to support a burst of Bs bytes.

At block 706, method 700 calculates Rp_adj from parameters Rp, Bp, Tp, BT, and MBS using equations (1)-(6) above. Method 700 creates a constant rate emitter using Rp_adj at block 708.

Method 700 further executes a processing loop (blocks 710-726) to transmit byte(s) using the sustained rate and constant rate emitter. At block 712, method 700 determines if tokens should be added to the sustained rate token bucket. If not, control is passed to block 716. On the other hand, if additional tokens are to be added to the sustained rate token bucket, method 700 adds the appropriate amount based on sustained rate allowed, Rs, and the time in-between the current and previous byte transmission at block 714. For example, consider the example for a sustained rate token bucket with a Bs of 1000 bytes. If the time in-between transmitting successive packets is 0.25 seconds, then method 700 adds 250 bytes to the sustained rate token buckets, respectively. Control is passed from block 714 to block 716.

At block 716, method 700 determines if there are enough available tokens in the sustained rate token bucket to transmit the available byte(s). In one embodiment, method 700 compares the number of tokens available in the sustained rate token bucket with the bytes in the next available packet queued for transmission. If there are enough tokens available, control passes to block 718. Otherwise, control passes to block 722.

At block 718, method 700 determines if it is okay to transmit the byte(s) based on the constant rate emitter. In one embodiment, method 700 compares the current time with the next packet time based on the constant rate emitter parameter. If current time is equal to or later than the next packet time, control passes to block 720. In an alternate embodiment, the constant rate emitter monitors the current transmission rate and allows the transmission of the byte(s) if the transmission would be within Rp_adj. In a further embodiment, the constant rate emitter allows transmission of the byte(s) if the current transmission rate is less than or equal to Rp_adj. Otherwise, control passes to block 722.

At block 720, method 700 transmits the byte(s). While in one embodiment, method 700 de-queues the packet from the appropriate transmit packet queue and transmits the packet byte(s) on the appropriate physical interface, in alternate embodiments, method 700 transmits the byte(s) using other algorithms known in the art for packet transmission. Method 700 decrements the tokens for the sustained rate and record the current transmission time and the number of byte(s) transmitted or just the calculated next transmission time in block 720 for the constant rate emitter to decide the next packet transmission. For example, if method 700 transmits a packet of 400 bytes, method 700 decrements the sustained rate token buckets by 400 bytes and decides the next packet time would be Rp_adj*400 later. Control is passed to block 726.

At block 722, method 722 takes alternative action if method 700 cannot transmit the byte(s). This typically happens when there are not enough tokens in the token bucket to allow method 700 to transmit the available byte(s), or due to the current time is earlier than the next packet time decided by the constant rate emitter. While in one embodiment, the alternative action taken by method 700 is to delay transmitting of the available packets, in alternate embodiments, method 700 can drop the packet, or re-queue the packet, etc. The processing loop ends at block 726.

The embodiments described above are formulated on a per-bytes basis. In an alternative embodiment, the improved token bucket algorithm is formulated on a per packet basis when the traffic shaper transmits a stream of data comprising fixed sized packets. While in one embodiment, a fixed size packet is an ATM cell, in alternate embodiments, the fixed sized packet is a different type of fixed size packet, such as a Frame Relay frame, synchronous optical network frame, etc. In this embodiment, the improved token bucket algorithm utilizes Equations (1)-(6), except the size measured in number of bytes is substituted with number of packets and the rate measured in bytes per second with packets per second.

Another embodiment of the improved dual token algorithm handles variable sized packets, but assumes a maximum packet size. While in one embodiment, variable sized packets are Ethernet frames with a maximum corresponding to the maximum transmission unit for an Ethernet physical interface, in alternate embodiments, the variable sized packets can be some other variable sized packet (e.g. IP packets, etc.) with the same or different maximum size. In this embodiment, Equation (1) are modified in the following manner (Equations (2)-(5) remain the same). The maximum packet size is given by maxPkt and Bp>=maxPkt. In addition, an intermediate parameter is defined as, $$Bp\_act = Bp - \text{max}Pkt \quad (8)$$

Bp_act replaces Bp in Equation (1). Thus, $$Tp = \frac{(Bp\_act - 1)}{Rp} \quad (9)$$

Using the parameters given above, the traffic shaper transmits a packet by combining the bytes allocated by the byte-oriented traffic shaper into a packet and transmitting the packet at the time for the first byte. The traffic shaper waits for a time period determined by the maximum packet size.

In this embodiment, the traffic shaper's constant rate emitter governs transmittal of a packet at the time allocated for the first byte in the byte-oriented equations, waits for a time period decided by the byte-oriented equations to cover the bytes in the packet, and repeats the transmitting and waiting cycles. In addition, transmission of a packet at any time in the peak rate period does not extend the allocated byte time into the sustained rate period. If it did not fulfill this rule, the sustained rate token bucket allows the packet to be sent after it gains all the needed tokens in the sustained rate period. At the beginning of the peak rate period, the maximum packet can be sent is equal to the maxPkt bytes long. At times between the beginning and ending of the peak rate period, the allowed maximum packet size is always equal to the maxPkt. This corresponds to the maxPkt bytes reserved by equation (8)'s subtracting maxPkt bytes from the original peak rate token bucket size for all the other calculation. At the end of the peak rate period, the imaginary original peak rate token bucket shall still have at least maxPkt bytes left. As with the byte-oriented traffic shaper described above, the original peak rate token bucket depth is always equal to or greater than zero, which allows the original traffic contract to be complied with.

Furthermore, the traffic shaper can apply different embodiments of the improved token bucket algorithm to different types of stream of data. For example and by way of illustration, in one embodiment, the traffic shaper can apply the byte oriented improved token bucket algorithm to one stream of data, a packet oriented improved token bucket to a second stream of data comprising fixed sized packets, and a variable packet size improved token bucket algorithm to a stream of data comprising variable sized packets, but with a maximum packet size.

Figure 8:
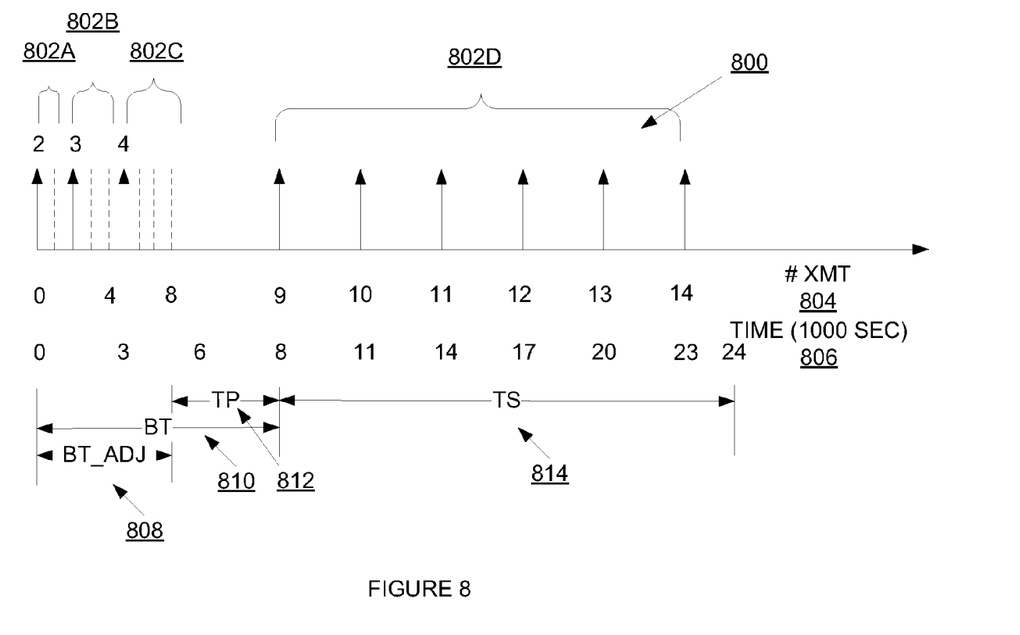
FIG. 8 is an illustration of a byte transmission graph by a traffic shaper utilizing an improved token bucket traffic shaper assuming a maximum packet size according to one embodiment of the invention.

FIG. 8 is an illustration of a byte transmission graph 800 by a traffic shaper utilizing an improved token bucket traffic shaper transmitting variable sized packets assuming a maximum packet size according to one embodiment of the invention. In FIG. 8, the traffic shaper transmits packets 802A-D on time line 806. Packets 802A-D have different sizes: packet 802A is size two, packet 802B is size three, packet 802C is size four, while packets 802D are size one. In FIG. 8, the parameters values illustrated are:

$$\text{max}Pkt = 4$$

$$Bp = 8$$

$$Rp = \frac{1}{1000}$$

$$Rs = \frac{1}{3000}$$

$$MBS = 9$$

$$Bp\_act = Bp - \text{max}Pkt = 4$$

$$Tp = \frac{Bp\_act - 1}{Rp} = 3000$$

$$BT = 8000$$

$$Ts = 16000$$

$$Bs = (Tp + Ts) * Rs + 1 = \frac{22}{3}$$

$$Rp\_adj = 1/625$$

$$BT\_adj = 5000$$

Superimposed on timeline 806 is when the traffic shaper transmits bytes 802A-D as illustrated by byte timeline 804.

The traffic shaper transmits packets 802A-C quickly, because the constant rate emitter governs the transmission of these packets with rate Rp_adj. BT_adj 808 represents the adjusted burst period for the constant rate emitter. In contrast, BT 810 is a longer time period than BT_adj 808. FIG. 8 further illustrates the delay deviation parameters Tp 812 and Ts 814. On the other hand, the traffic shaper transmits bytes 802D at a rate, Rs, governed by the sustained rate token bucket.

Figure 9:
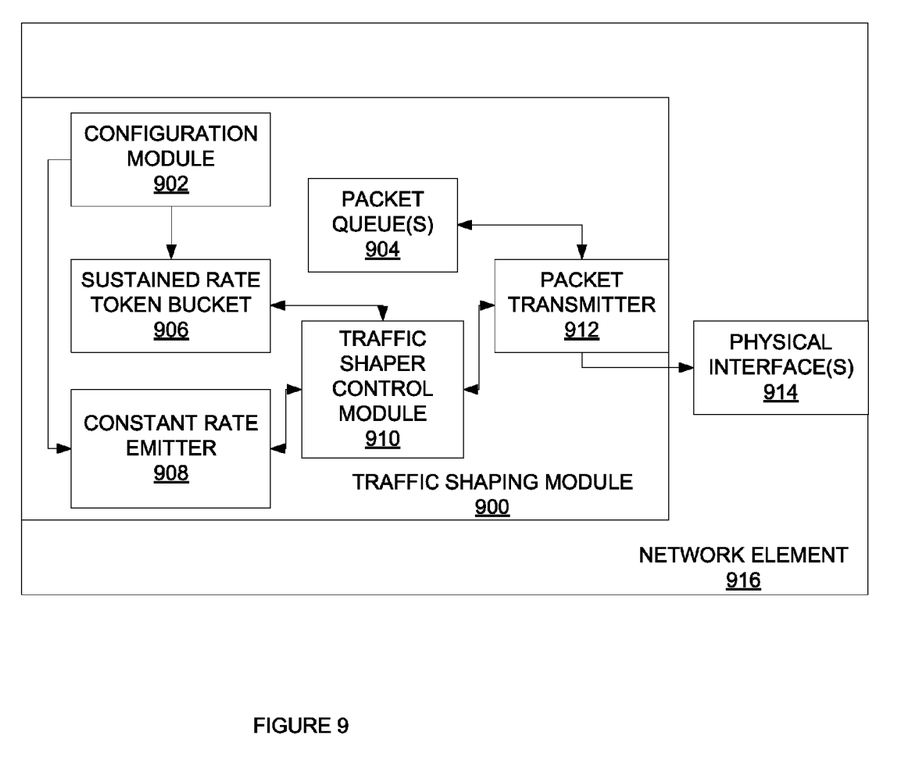
FIG. 9 is a block diagram illustrating a traffic shaping module incorporating an improved token bucket algorithm, according to one embodiment of the invention.

FIG. 9 is a block diagram illustrating a traffic shaping module 900 incorporating a improved token bucket algorithm, according to one embodiment of the invention. In FIG. 9, a traffic shaping module 900 comprises a configuration module 902, packet queue(s) 904, sustained rate token bucket 906, constant rate emitter 908, traffic shaper control module 910, and transmitter 912. Configuration module 902 couples to the sustained rate 906 and constant rate emitter 908. Furthermore, configuration module 902 configures receives the traffic shaping parameters (e.g., Rs, Bs, Rp, Bp, etc.) and uses these parameters to setup the token buckets as described in FIG. 7, at blocks 702-708.

Packet queue(s) 904 stores the packets waiting to be transmitted by transmitter 910. While in one embodiment there is one packet queue that holds all of the packets waiting to be transmitted out physical interface(s) 912, in alternate embodiments, there is a plurality of queues for different type of packets. In the alternate embodiments, packets can be classified using a variety of techniques known in the art, such as by destination address, source address, customer, application type, etc.

Sustained rate token bucket 906 and constant rate emitter 908 holds the tokens and keeps record of last packet transmission time and packet size or just the calculated next packet time. They are used by traffic shaper control module 910 in determining whether the packet transmitter 912 can transmit the next available packet. The bucket and emitter are further coupled to traffic shaper control module 910.

Traffic control shaper module 910 further couples to packet transmitter 912 and control whether an available packet can be transmitted by packet transmitter 912. In one embodiment, traffic shaper control module 910 checks the sustained rate token bucket 906 and constant rate emitter 908 to determine there are enough tokens and the next emitting time is up to allow packet transmitter 912 to transmit the next available packet as described in FIG. 7, blocks 716-718 and 722. Furthermore, traffic shaper control module adds and decrements tokens from the token bucket and calculates and keeps the next packet transmission time in the constant rate emitter as described in FIG. 7, blocks 712-714 and 724.

If allowed by traffic control shaper module 910, packet transmitter 912 de-queues a packet from packet queue(s) 904 and transmits the packet out one or more of the physical interface(s) 914 as further described in FIG. 7, block 720.

In addition, network element 914 comprises traffic shaping module 900 and physical interface(s) 912, where traffic shaping module 900 couples to physical interface(s) 912.

Figure 10:
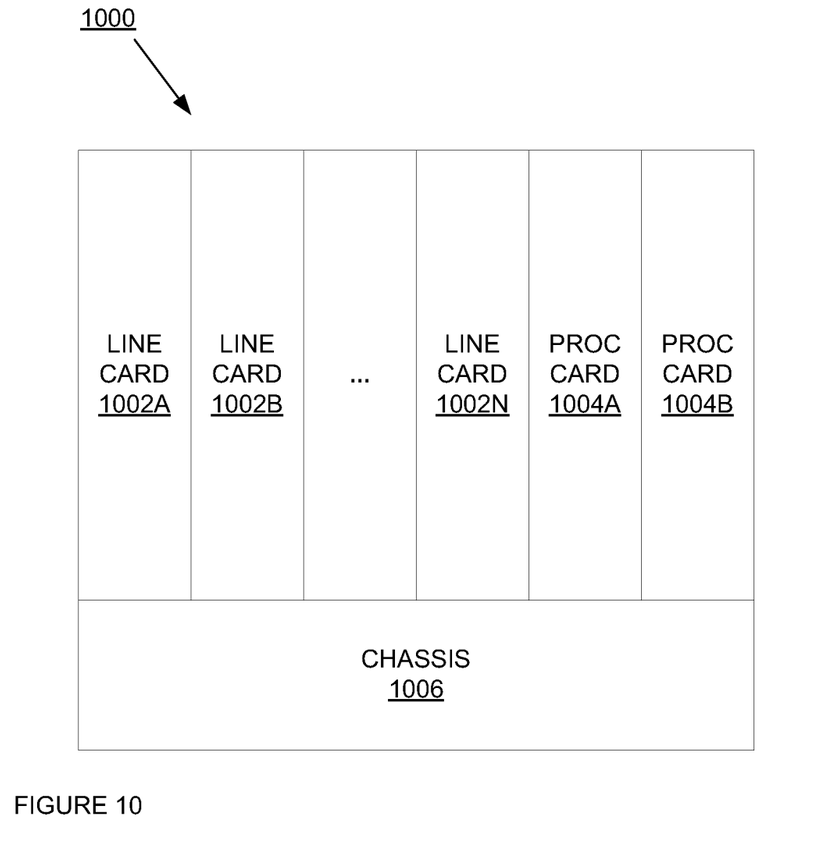
FIG. 10 is a block diagram illustrating a traffic shaper incorporating an improved token bucket algorithm, according to one embodiment of the invention.

FIG. 10 is a block diagram illustrating a network element 1000 incorporating a improved token bucket algorithm, according to one embodiment of the invention. While in one embodiment of the invention chassis 1006 is coupled to line cards 1002A-N and processing cards 1004A-B, other embodiments of the invention describe multiple other devices and/or modules coupled to chassis 1006. While in one embodiment, traffic shaping algorithms may be part of line cards 1002A-N and/or processing cards 1004A-B, alternate embodiments may have alternate card arrangements (a combined line and processing card with one or more ports and a forwarding engine, one processing card per line card, multiple processing card per line card, etc.). Network element 1000 includes line cards 1002A-N to forward packets.

This implementation of the traffic shaping module is an example, and not by way of limitation. Thus, network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The traffic shaping module cards as well as line cards 1002A-N, and processor cards 1004A-B included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

ALTERNATIVE EMBODIMENTS

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    receiving, by a traffic shaper, a set of traffic shaping parameters to shape a first stream of data of a plurality of streams of data by a traffic shaper, the set of traffic shaping parameters comprising a sustained rate, a sustained burst size, a peak rate, and a peak burst size;
    determining an adjusted maximum transmission rate from the set of traffic shaping parameters, wherein the adjusted maximum transmission rate is a maximum constant rate of a constant rate emitter the traffic shaper uses to transmit the first stream of data, and wherein the adjusted maximum transmission rate is higher than the peak rate;
    periodically adding a plurality of tokens to a fixed sized sustained rate token bucket, wherein the number of the plurality of tokens added is based on the sustained rate and the sustained burst size;
    monitoring a current transmission rate the traffic shaper is transmitting the first stream of data;
    transmitting parts of the stream of data if there are currently enough tokens in the fixed sized sustained rate token bucket and based on a comparison of the current transmission rate of the stream of data and the adjusted maximum transmission rate.

2. The method of claim 1, wherein the allowing transmitting further comprises:
    determining the size of the part in the stream of data;
    comparing the size with the number of tokens in fixed sized sustained rate token bucket; and
    comparing the current transmission rate with the adjusted maximum transmission rate.

3. The method of claim 1, wherein the stream of data comprises a plurality of fixed sized packets.

4. The method of claim 1, wherein the stream of data comprises a plurality of variable sized packets, wherein each packet in the plurality of packets is less than or equal to a maximum packet size.

5. The method of claim 1, further comprising:
    allowing transmission of a second stream of data using a different sustained rate token bucket, a different set of traffic shaping parameters, and a different adjusted maximum transmission rate, wherein the different sustained rate token bucket uses the different set of traffic shaping parameters.

6. The method of claim 1, wherein deriving the adjusted transmission rate uses the equation $$Rp\_adj = Rp * \frac{1}{1 - \frac{Tp}{BT}}, \text{ if the } Tp < BT,$$

where Tp is the delay deviation tolerance for the peak rate traffic and BT is the maximum burst time in which peak rate transmission can last.

7. The method of claim 6, wherein Rp_adj is further adjusted to a downstream maximum rate if the downstream maximum rate is less the Rp_adj.

8. The method of claim 1, wherein the plurality of streams of data is classified by at least one of source address, destination address, VLAN tag, MPLS tag, TOS bit, DiffServ bit, data type, and packet type.

9. A machine-readable medium that stores instructions, which when executed by a set of one or more processors, cause said set of processors to perform operations comprising:
    receiving a set of traffic shaping parameters to shape a first stream of data of a plurality of streams of data by a traffic shaper, the set of traffic shaping parameters comprising a sustained rate, a sustained burst size, a peak rate, and a peak burst size;
    determining an adjusted maximum transmission rate from the set of traffic shaping parameters, wherein the adjusted maximum transmission rate is a maximum constant rate of a constant rate emitter the traffic shaper uses to transmit the first stream of data, and wherein the adjusted maximum transmission rate is higher than the peak rate;
    periodically adding a plurality of tokens to a fixed sized sustained rate token bucket, wherein the number of the plurality of tokens added is based on the sustained rate and the sustained burst size;
    monitoring a current transmission rate the traffic shaper is transmitting the first stream of data;
    transmitting parts of the stream of data if there are currently enough tokens in the fixed sized sustained rate token bucket and based on a comparison of the current transmission rate of the stream of data and the adjusted maximum transmission rate.

10. The machine-readable medium of claim 9, wherein the transmitting further comprises:
   determining the size of the part in the stream of data;
   comparing the size with the number of tokens in fixed sized sustained rate token bucket; and
   comparing the current transmission rate with the adjusted maximum transmission rate.

11. The machine-readable medium of claim 9, wherein the stream of data comprises a plurality of fixed sized packets.

12. The machine-readable medium of claim 9, wherein the stream of data comprises a plurality of variable sized packets, wherein each packet in the plurality of packets is less than or equal to a maximum packet size.

13. The machine-readable medium of claim 9, further comprising:
   allowing transmission of a second stream of data using a different sustained rate token bucket, a different set of traffic shaping parameters, and a different adjusted maximum transmission rate, wherein the different sustained rate token bucket uses the different set of traffic shaping parameters.

14. The machine-readable medium of claim 9, wherein deriving the adjusted transmission rate uses the equation $$Rp\_adj = Rp * \frac{1}{1 - \frac{Tp}{BT}}, \text{ if the } Tp < BT,$$

where Tp is the delay deviation tolerance for the peak rate traffic and BT is the maximum burst time in which peak rate transmission can last.

15. The machine-readable claim of claim 14, wherein Rp_adj is further adjusted to a downstream maximum rate if the downstream maximum rate is less the Rp_adj.

16. The machine-readable medium of claim 9, wherein the plurality of streams of data is classified by at least one of source address, destination address, VLAN tag, MPLS tag, TOS bit, DiffServ bit, data type, and packet type.

17. An apparatus comprising:
   a traffic shaper module comprising,
   a configuration module to receive a set of traffic shaping parameters, the set of traffic shaping parameters comprising a sustained rate, a burst size, a peak rate, and a sustained rate, and to determine an adjusted maximum transmission rate from the set, wherein the adjusted transmission rate determines a maximum constant rate the traffic shaper module can transmit a stream of data, and wherein the adjusted maximum transmission rate is higher than the peak rate,
   a fixed sized sustained rate token bucket comprising a first plurality of tokens,
   a constant rate emitter to allow transmission of the stream of data at equal to or less than the adjusted maximum transmission rate,
   a packet queue comprising a plurality of packets,
   a packet transmitter to transmit the plurality of packets, and
   a traffic shaper control module to control the transmitting of the plurality of packets by the packet transmitter, wherein the traffic shaper control module allows the packet transmitter to transmit the plurality of packets when there are enough tokens in the fixed sized sustained rate token bucket and the constant rate emitter allows for the transmission; and
   a set of one or more physical interfaces through which the packet transmitter transmits the plurality of packets.

18. The apparatus of claim 17, wherein the plurality of packets comprises a plurality of fixed sized packets.

19. The apparatus of claim 17, wherein the plurality of packets comprises a plurality of variable sized packets, wherein each packet in the plurality of packets is less than or equal to a maximum packet size.

20. A network element comprising:
   a set of one or more control cards, the control cards to process forwarding of packets between the set of one or more line cards; and
   a set of one or more line cards, each line card comprising a traffic shaping module and a set of one or physical interfaces, wherein the traffic shaping module comprises,
   a configuration module to receive a set of traffic shaping parameters, the set of traffic shaping parameters comprising a sustained rate, a burst size, a peak rate, and a sustained rate, and to determine an adjusted maximum transmission rate from the set, wherein the adjusted maximum transmission rate determines a maximum constant rate the traffic shaper module can transmit a stream of data, and wherein the adjusted maximum transmission rate is higher than the peak rate,
   a fixed sized sustained rate token bucket comprising a first plurality of tokens,
   a constant rate emitter to allow transmission of the stream of data at equal to or less than the adjusted maximum transmission rate,
   a packet queue comprising a plurality of packets,
   a packet transmitter to transmit the plurality of packets, and
   a traffic shaper control module to control the transmitting of the plurality of packets by the packet transmitter, wherein the traffic shaper control module allows the packet transmitter to transmit the plurality of packets when there are enough tokens in the fixed sized sustained rate token bucket and the constant rate emitter allows for the transmission.

21. The network element of claim 20, wherein the plurality of packets comprises a plurality of fixed sized packets.

22. The network element of claim 20, wherein the plurality of packets comprises a plurality of variable sized packets, wherein each packet in the plurality of packets is less than or equal to a maximum packet size.

* * * * *

UNITED STATES PATENT AND TRADEMARK OFFICE
CERTIFICATE OF CORRECTION

PATENT NO. : 8,565,086 B2  
APPLICATION NO. : 12/899367  
DATED : October 22, 2013  
INVENTOR(S) : Chen et al.

Page 1 of 1

It is certified that error appears in the above-identified patent and that said Letters Patent is hereby corrected as shown below:

Title Page, Item (56), under "OTHER PUBLICATIONS", in Column 2, Line 19, delete "Wrzburg" and insert -- Würzburg --, therefor.

In the Specifications

In Column 1, Line 20, delete "flow," and insert -- flow --, therefor.

In Column 1, Lines 66-67, delete "and for" and insert -- and/or --, therefor.

In the Claims

In Column 15, Line 37, in Claim 15, delete "machine-readable claim" and insert -- machine-readable medium --, therefor.

Signed and Sealed this  
Twenty-second Day of April, 2014

Michelle K. Lee  
*Deputy Director of the United States Patent and Trademark Office*